US009978085B2

(12) United States Patent
Robinson et al.

(10) Patent No.: US 9,978,085 B2
(45) Date of Patent: May 22, 2018

(54) METHOD AND SYSTEM FOR IMPLEMENTING CLOUD BASED MARKETING INTEGRATION WITH EXTERNAL CONTENT

(71) Applicant: Oracle International Corporation, Redwood Shores, CA (US)

(72) Inventors: Andrew W. Robinson, Ontario (CA); Robert Paulsen, London (GB); Umair Akeel, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 824 days.

(21) Appl. No.: 14/490,337

(22) Filed: Sep. 18, 2014

(65) Prior Publication Data
US 2015/0081451 A1 Mar. 19, 2015

Related U.S. Application Data

(60) Provisional application No. 61/879,951, filed on Sep. 19, 2013.

(51) Int. Cl.
*G06Q 30/00* (2012.01)
*G06Q 30/02* (2012.01)
*G06Q 10/10* (2012.01)
*H04L 29/08* (2006.01)
(Continued)

(52) U.S. Cl.
CPC ....... *G06Q 30/0269* (2013.01); *G06Q 10/107* (2013.01); *H04L 12/1859* (2013.01); *H04L 51/02* (2013.01); *H04L 51/10* (2013.01); *H04L 67/20* (2013.01); *H04L 67/26* (2013.01)

(58) Field of Classification Search
CPC .. G06Q 50/01; G06Q 30/0277; G06Q 30/016; G06Q 30/0643; G06Q 50/14; G06Q 10/063112; G06Q 10/083; G06Q 10/087; G06Q 20/102; G06Q 20/108; G06Q 20/223; G06Q 20/3226; G06Q 20/36; G06Q 20/3674; G06Q 20/382; G06Q 20/3829; G06Q 20/401; G06Q 30/0203; G06Q 30/0275; G06Q 30/04; G06Q 30/0601; G06Q 30/0611; G06Q 30/0619; G06Q 30/0623; G06Q 30/0641; G06Q 40/025; G06Q 40/04; G06Q 50/06
See application file for complete search history.

(56) References Cited

U.S. PATENT DOCUMENTS

| 7,065,555 B2 | 6/2006 | Foulger et al. |
| 7,386,594 B2 | 6/2008 | Foulger et al. |
| 7,693,950 B2 | 4/2010 | Foulger et al. |

(Continued)

FOREIGN PATENT DOCUMENTS

| JP | 2012141682 A | * | 7/2012 | ............. G06Q 30/02 |

OTHER PUBLICATIONS

Zugec, Ivan. Configuring Layouts with Display Suite in Drupal 7 (Nov. 26, 2012) Retrieved online Mar. 22, 2018. https://www.webwash.net/configuring-layouts-with-display-suite-in-drupal-7/ (Year: 2012).*

*Primary Examiner* — James A Reagan
(74) *Attorney, Agent, or Firm* — Fish IP Law, LLP

(57) ABSTRACT

Disclosed is an approach for implementing an improved system, method, and computer program product for a marketing automation product, where an external content service is integrated with the marketing automation tool.

22 Claims, 14 Drawing Sheets

(51) Int. Cl.
*H04L 12/58* (2006.01)
*H04L 12/18* (2006.01)

(56) References Cited

U.S. PATENT DOCUMENTS

| | | |
|---|---|---|
| 9,300,611 B2 | 3/2016 | Mody |
| 9,633,399 B2 | 4/2017 | George et al. |
| 2012/0151500 A1* | 6/2012 | Leung ................... G06Q 50/01 |
| | | 719/316 |
| 2014/0289391 A1* | 9/2014 | Balaji ................... H04L 43/04 |
| | | 709/224 |
| 2014/0351063 A1* | 11/2014 | Brewer .............. G06Q 30/0276 |
| | | 705/14.72 |

* cited by examiner

METHOD AND SYSTEM FOR IMPLEMENTING CLOUD BASED MARKETING INTEGRATION WITH EXTERNAL CONTENT

CROSS-REFERENCE TO RELATED APPLICATIONS

This application claims the benefit of priority to U.S. Provisional Application No. 61/879,951, filed on Sep. 19, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Given the widespread availability and usage of the internet by consumers, many businesses have become interested in being able to effectively implement marketing solutions that can target consumers over the internet. To accomplish this, many marketers are now using marketing automation tools to target prospects, execute marketing campaigns, send leads to sales in real time, and to convert marketing leads into actual sales. An exemplary example of a commercially available marketing automation product is the Eloqua product, available from Oracle Corporation of Redwood Shores, Calif.

The marketing automation tool can be configured to perform many types of marketing functions, such as targeting, engagement, conversion, and analytics. The marketing automation tool can perform targeting, for example, by capturing data about prospects from online interactions and/or online behavior from website visits, downloads, social networks, and searches. This allows profiles to be constructed to more accurately provide content alignment in the marketing materials. Engagement can be implemented, for example, by using the marketing automation system to efficiently create campaigns, mapping a prospect's online behavior to display ad versions to individually target and personalize to the recipient, and by curating content from the prospect's trusted networks, and to tie social activities to leads, pipeline, and even revenue. Conversions can be facilitated by using the marketing automation system to implement better sales alignment, by aligning marketing and sales processes to boost revenue performance using profiles, content, and engagement. In addition, sales can be enabled by using pre-populated templates with consistent branded content that can be used to nurture and close deals. The marketing automation tool can also be used to provide analytics for the marketing activities, e.g., by using dashboards and closed-loop reporting tools. Marketing ROI can be obtained, by measuring marketing return on investment and report on performance from major initiatives to individual campaigns. Benchmarking can also be performed, by measuring against other marketers.

An efficient way to implement such marketing automation solutions is by providing a cloud and/or SAAS (software as a service) approach, where a hosted system is provided to customers (e.g., marketers) to perform the marketing automation tasks. This is a software delivery model where software and its associated data are hosted using a cloud-based infrastructure. One of the biggest advantages for a company to use a cloud/SaaS-based approach is the great potential to reduce IT support costs by outsourcing hardware and software maintenance and support to the cloud/SaaS provider. Another key advantage is that the cloud/SaaS provider often has concentrated expertise in the product being delivered, allowing the company to have access to higher performing products and greater feature sets, while often usually paying less in overall costs.

However, one drawback with this approach is that since the cloud/SaaS provider is a separate entity from its customer, there are significant barriers to effective integration between systems owned by the cloud/SaaS provider and the customer. These barriers could result in inefficiencies when creating content to be distributed by the marketing automation system, and in some cases could prevent certain kinds of marketing content from being created and used by the system.

To address these issues, embodiments of the present invention provide a system, method, and computer program product for integrating content from an external service into a marketing automation tool.

Other additional objects, features, and advantages of the invention are described in the detailed description, figures, and claims.

DETAILED DESCRIPTION

Embodiments of the present invention provide a system, method, and computer program product for integrating content from an external service into a third party marketing automation tool.

As noted above, one drawback when using a cloud/SaaS architecture to provide marketing automation is that since the cloud/SaaS provider is a separate entity from its customer, there are significant barriers to effective integration between systems owned by the cloud/SaaS provider and the customer. These barriers could result in inefficiencies when creating content to be distributed by the marketing automation system, and in some cases could prevent certain kinds of marketing content from being created and used by the system.

Consider the needs of a typical marketer when implementing an email campaign. As part of the email campaign, it is often desirable to send personalized emails that include content specific to the recipient of the email. However, in conventional systems, the third party marketing automation system is unable to generate the personalized content if the necessary content is only available from the secured, internal systems owned by the customer.

For example, assume that the marketer at a securities brokerage firm would like to implement an email campaign, where the emails are customized to include personal financial content for each of the email recipients. This type of email campaign would not be possible when using conventional marketing automation system owned by third parties, since the confidential nature of the personalized content forces the brokerage firm to maintain tight security controls over the information. This makes it impossible for the marketing automation system to be integrated enough with the brokerage firm's systems to generate the personalized emails.

Embodiments of the present invention provide an infrastructure for integrating content from an external service into a third party marketing automation tool that addresses these problems with the conventional solutions.

Figure 1A:
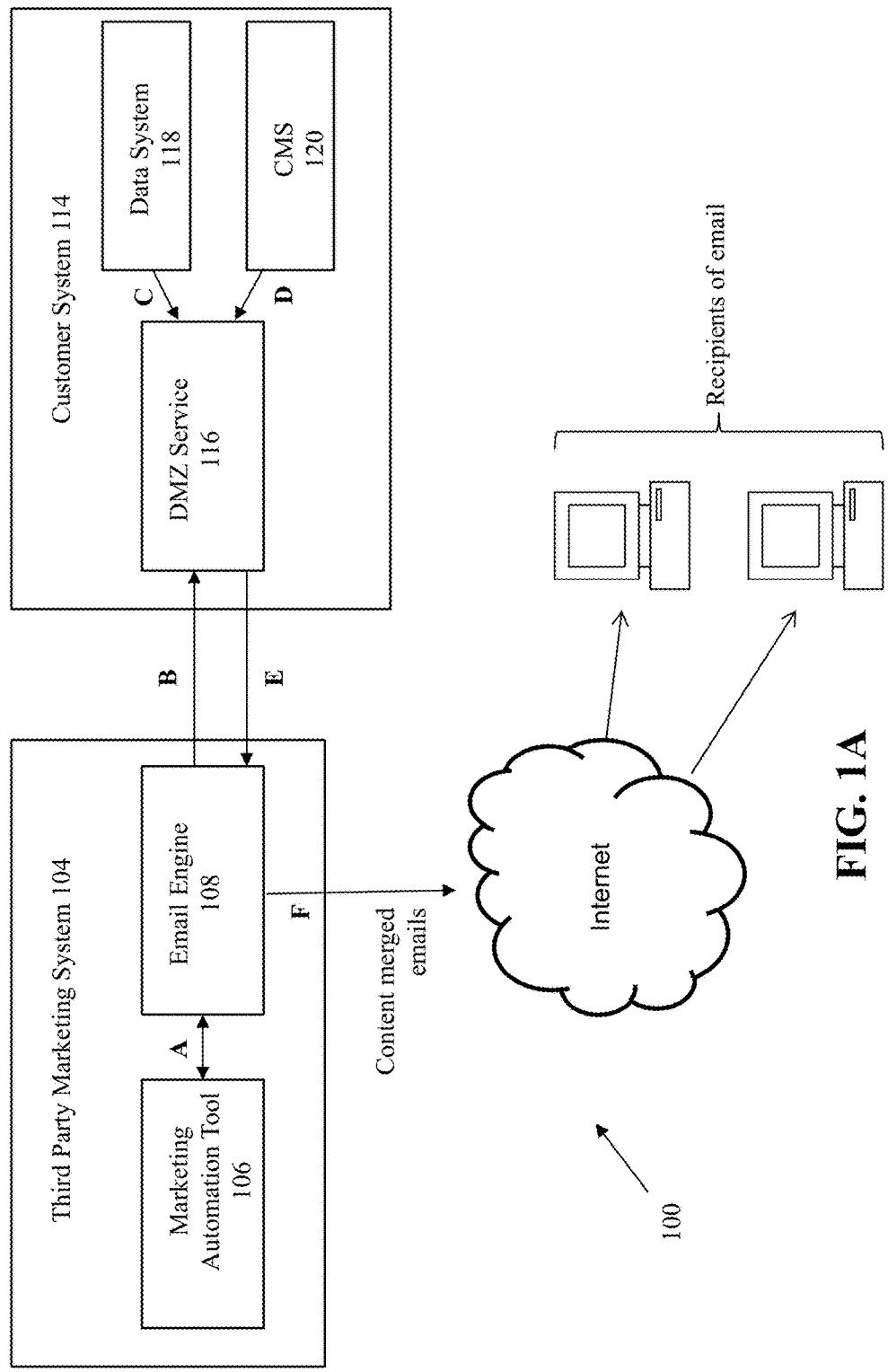
FIG. 1A illustrates an example system which may be employed in some embodiments of the invention to implement a marketing automation solution.

FIG. 1A illustrates an example system 100 which may be employed in some embodiments of the invention to implement a marketing automation solution. The system 100 includes a third party marketing system 104. The third party marketing system 104 comprises any business and/or marketing related set of functionality that is accessible to users of the system. For example, the third party marketing system 104 can be configured to provide functionality to setup, configure, and implement an email campaign from a customer. Therefore, the third party marketing system 104 may include a marketing automation tool 106 and an email engine 108.

Content for the email campaign may be provided from an external service. In the current embodiment, the external service is provided using the customer system 114. The customer system includes a security isolation service 116 (hereinafter referred to as a "de-militarized-zone" or "DMZ" service). The DMZ service 116 allows for a secure, firewalled configuration where internal LAN within the DMZ firewall are secure from the outside world, and the DMZ service 116 intercept traffic and broker requests for the rest of the LAN. For example, the internal network within the customer system 114 may include one or more data management/analysis systems 118 (e.g., a statistics management system) and one or more CMS (content management systems) 120.

In operation, at A, the marketing automation tool 106 is used to initiate an email deployment, e.g., by setting up and starting an email campaign. As part of the set-up activities, the email campaign is configured to insert content from an external service into personalized emails. Information pertaining to the emails deployment is communicated to the email engine 108 to prepare and send the personalized emails.

At B, the email engine sends a request for cloud content to the appropriate external content service. As part of the initial set-up, configuration information was created that instantiated one or more "instances" of the external service for the personalized emails of the campaign. This allows the email engine to identify the specific external service to contact to request the cloud content.

At C, the customer system 114 will (internally) retrieve the necessary information for the personalized emails. For example, the data management/analysis system 118 will retrieve the necessary data for the personalized emails. In addition, at D, the CMS 120 within the customer system 114 will retrieve the necessary content for the email personalization.

At E, the content is then merged and returned to the email engine 108 at the third party marketing system 104. An applications programming interface (API) is used by the customer system to return the content to the email engine. At F, the email engine 108 merges the cloud content from into the rest of the email template to generate the personalized emails. The personalized emails are then deployed to the intended recipients.

As described in more detail below, the integration with cloud-based content is implemented using an application programming interface for the cloud content instance that is accessible by the external service consumer.

The system 100 includes one or more users at one or more user stations that use the system 100 to operate and interact with the third party marketing system 104 and/or customer system 114. The user station comprises any type of computing station that may be used to operate or interface with the marketing automation applications in the system 100. Examples of such user stations include, for example, workstations, personal computers, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs to the enterprise application and/or social networking application.

Various items of data within the system 100 may be implemented using customer/marketing data stored into a database in a computer readable storage device. This data may include details and parameters for the marketing campaigns that have been established using the marketing automation tool. The data may also include data about the prospects/customers to which the emails will be sent, as well as content for the emails. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

The embodiments of the invention are described illustratively herein in the context of email deployments. It is noted, however, that the invention may be applied to other types of functionality performed at a cloud/SaaS-based tool. Therefore, the invention is not deemed to be limited in it application only to email deployments or to marketing automation tools unless specifically claimed as such.

For example, the invention may also be applied to integrate external cloud content into a marketing landing page. Such landing pages can be implemented to construct a marketing web page having tailored personalized content (such as targeted advertisements, personal financial data, etc.).

Figure 1B:
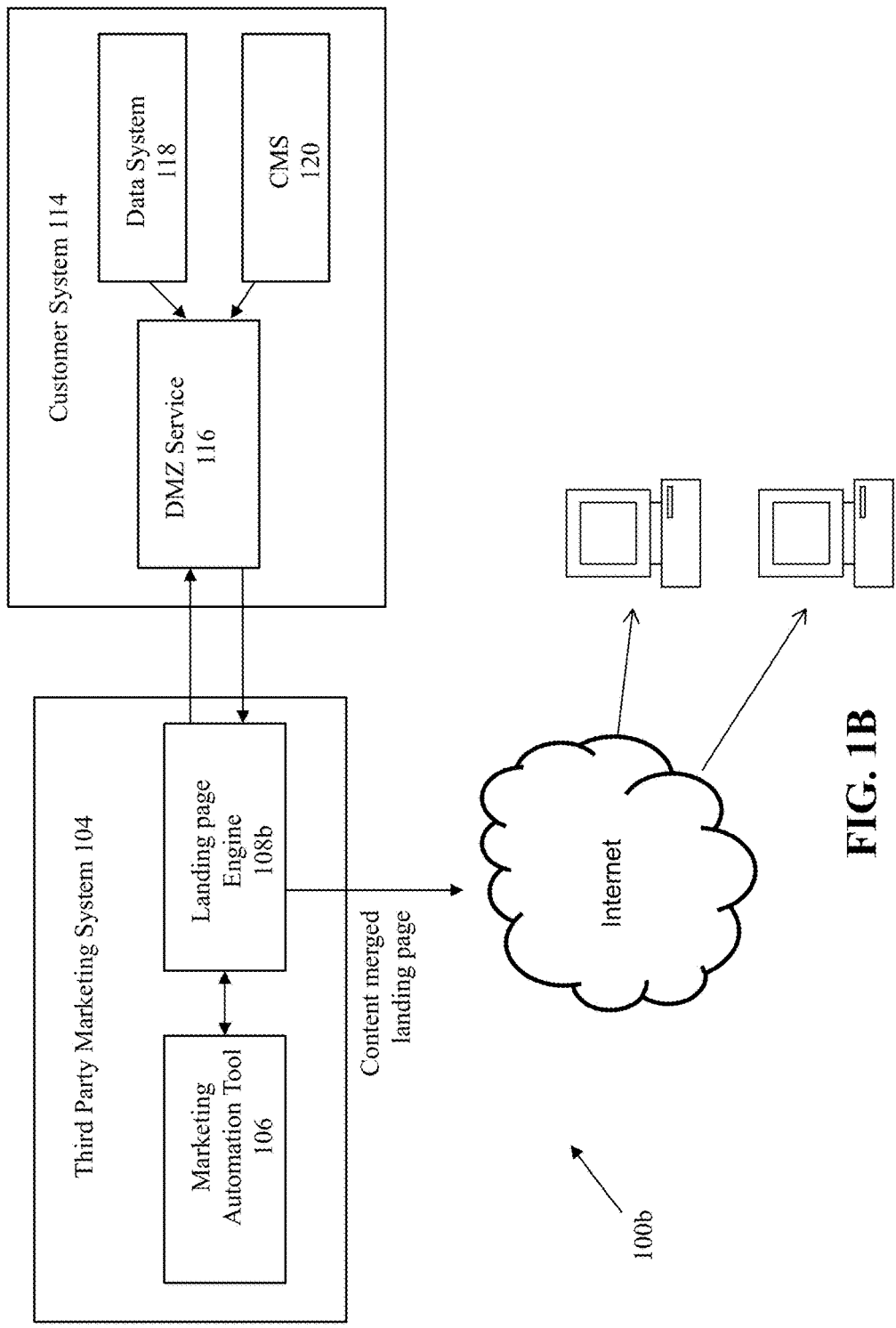
FIG. 1B illustrates an example system which may be employed in some embodiments of the invention to implement a marketing automation solution for personalized landing pages.

FIG. 1B illustrates an example system 100b which may be employed in some embodiments of the invention to implement a marketing automation solution for personalized landing pages. The system 100b includes a third party marketing system 104. As before, the third party marketing system 104 comprises any business and/or marketing related set of functionality that is accessible to users of the system. For example, the third party marketing system 104 may comprise a marketing automation tool 106 and a landing page engine 108b to provide functionality to setup, configure, and implement a landing page for a marketing customer.

Content for the landing page may be provided from an external service. In the current embodiment, the external service is provided using the customer system 114. As with the embodiment of FIG. 1A, the customer system includes a DMZ service 116, where the DMZ service 116 allows for a secure, firewalled configuration where the DMZ service 116 intercepts traffic and broker requests for the rest of the LAN. The internal network within the customer system 114 may include one or more data management/analysis systems 118 (e.g., a statistics management system) and one or more CMS (content management systems) 120.

Processing for the embodiment of FIG. 1B to generate personalized landing pages is similar to the processing used for the approach of FIG. 1A to generate personalized email deployments. However, as described in more detail below, the present embodiment uses synchronized content delivery for the landing page embodiment, whereas an asynchronous approach is used for the email deployment embodiment.

Illustrative Implementation

This document will now provide detailed information to describe an illustrative approach to implement various embodiments of the invention.

Various configuration details and/or definitions may be established for the Content Service and/or the Service Instances. For example, one configuration setting may be established for default content, which is the html content to be used when no external service is accessible and content is required. Another configuration setting may pertain to a layout as being either "flow" or "fixed". If flow is specified, then the external content will be allowed to flow in the host content, and not be constrained (except by width). If fixed is specified, then the external content will be constrained in height and width (as specified by the content instance), and will not be configurable in the editors. The editors in some embodiments may include feedback to the user, to indicate that the element can only be sized in certain ways (similar to the styling for a locked element). Yet another configuration setting may be established for a cache timeout, which pertains to an amount of time to cache the results of a decision answer for a particular contact and a particular instance.

For email deployments, configuration settings may specific details may include a "Html Batch" Url, which is the URL to call out to/from the email engine during send to obtain the HTML content of the configured instance. In addition, a content type can be configured for the Html Batch Url Content-Type, e.g., application/json or text/csv (which establishes whether to make any POST calls using application/json or text/csv). The email-specific parameters may also configure whether images are hosted locally. If images are found in the rendered html, then the email configuration settings can be used to indicate whether they should be imported to for better deliverability. Landing page specific details may include settings for identifying whether Html Urls are supported.

An API can be provided for the cloud content instance (pertaining to external service consumers). API data transfer objects (DTOs) definitions may also be established for the content service/service instances. The definitions may pertain to a configured width or a configured height of the content instance when it is rendered.

A "htmlUrl" parameter may be configured for the instance, which is the URL to call out to/from the landing page engine during render to obtain the HTML content of the configured instance. A "htmlBatchUrl" parameter may be configured for the instance, which is the URL to call out to/from the email engine during send to obtain the HTML content of the configured instance. This property may specify a callback URL, which is the URL to callback to for an asynchronous response.

To support interaction between the user interface of the marketing automation application and the external content configuration (e.g., cloud content configuration), REST (Representational State Transfer) API endpoints can be utilized. These include, for example: (a) content definition, which is the definition of the instance; (b) content definition retrieve endpoint (e.g., GET/system/cloud/component/{id}); (c) content definition search endpoint (e.g., GET/system/cloud/components?page={page}&pageSize={pageSize}&search={search}); (d) content definition contract, which includes properties for type (e.g., "CloudComponent"), ID of the service, a configured name, a configured description of the service, the configured icon to be displayed in the media browser, the name of the provider, whether a landing page is supported, whether email is supported, and whether the layout is fixed or flow; (e) content instance and whether the instance pertains to read/write from the internal API; (f) content instance create endpoint (e.g., POST/assets/cloud/component/{componentId}/instance); (g) content instance retrieve endpoint (e.g., GET/assets/cloud/component/instance/{id}); (h) content instance contract, which includes properties for type, ID of the instance, the ID of the component, the URL to call for the management UI from the external service (to be called in a new browser window or popup), the configured icon to be displayed in the editor, the configured height of the content section, the configured width of the content section.

Interaction Patterns

This section of the document will now provide detailed information for various interactive patterns for the illustrative examples.

It is noted that various personas can exist for the configuration and use of the embodiments of the invention. A developer persona pertains to development activities for the tool and its components. An administrator (admin) persona is used to configure the functionality of the system. For example, the admin persona is used to select and install the specific content services that can be accessed by a marketer that uses the tool. A marketer persona is the end user of the product. The marketer is the individual that will use the tool to insert instances of a content service into an email campaign or landing page.

With the marketer persona, the user interface presents a cloud content media browser to the user in an editor for either/both emails and landing pages. It is noted that the set of available content services can be filtered so that the email area shows content services that support the htmlBatchUrl (whether content is recipient specific or not), and the landing page area shows content services that support the htmlUrl.

Figure 2:
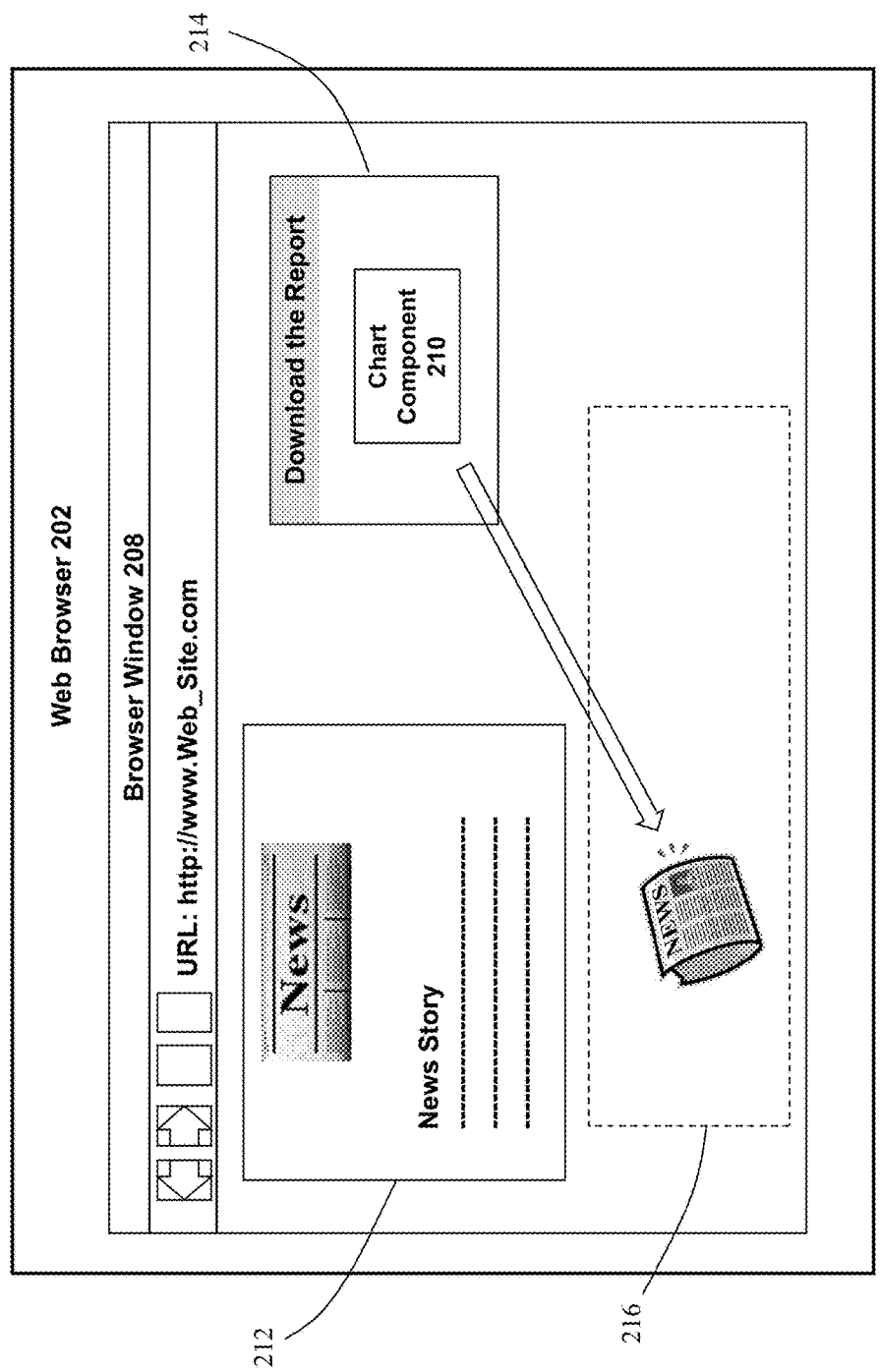
FIG. 2 shows an example interface that can be used to add cloud content to an Email/Landing Page.

FIG. 2 shows an example interface that can be used to add cloud content to an email/landing page. As previously noted, a marketing user should have the ability to add external content to an email or landing page through the editors. To do this, the interface displays a media browser 202 to the user, populated with content service definitions applicable to the area (email or landing page). By selecting a component item 210 from the browser window 208 in the browser 202, the user is able to add an instance 216 of the item 210 to the design or source code views (e.g., by selecting and dropping in the desired location in the design surface). This displays a content box (with the image Url from the content instance) to the user.

Figure 3:
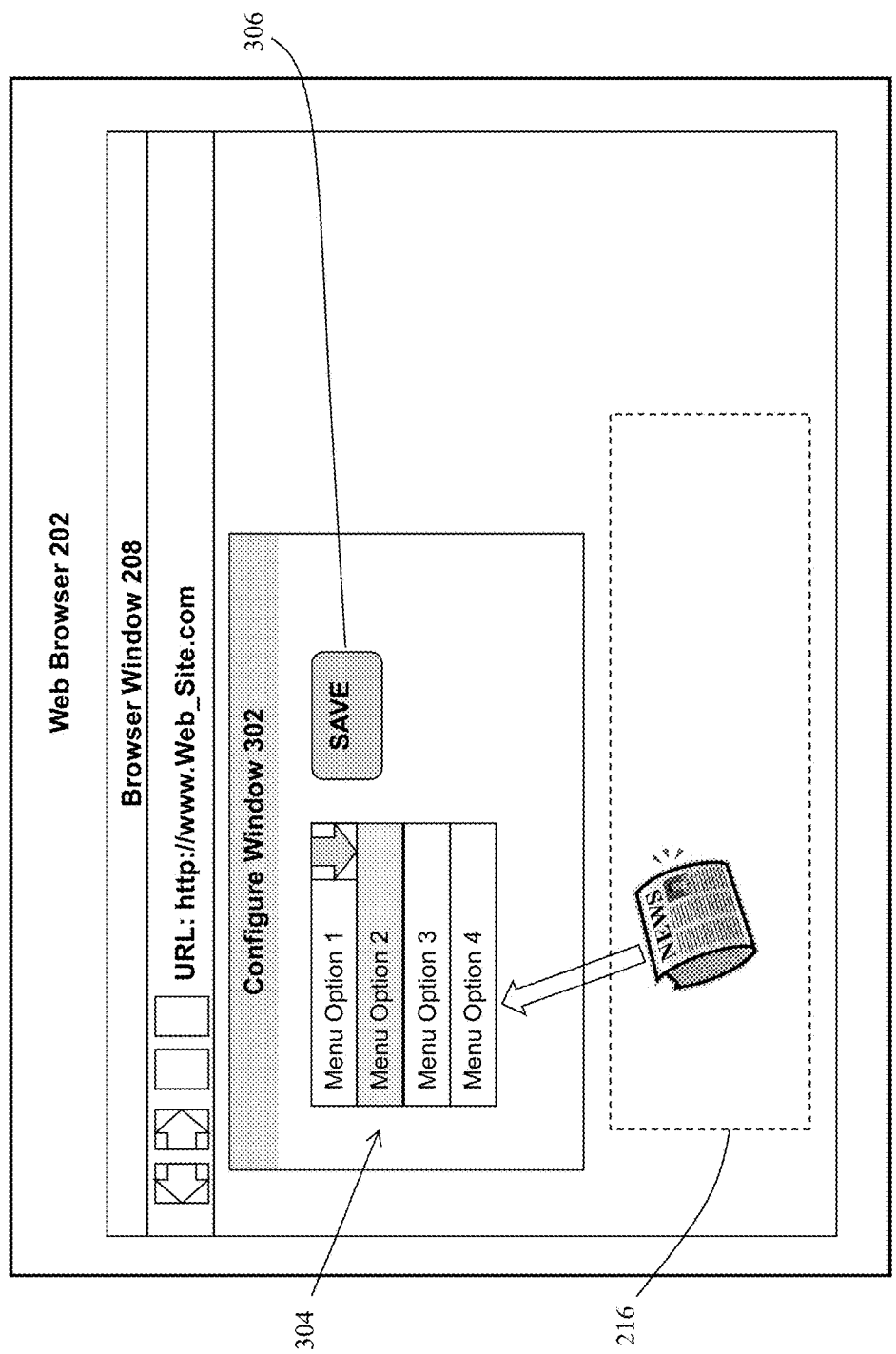
FIG. 3 shows an interface mechanism to configure the content instance.

The interface also provides a mechanism to configure the content instance. For example, as shown in FIG. 3, some embodiments allow the user to double click or right-click the content box 216 to configure it, e.g., by displaying the configure window 302 having one or more configuration menus 304.

This process creates a new instance 216 of the content service that is placed into the email/landing page. An instance identifier is then associated with the new instance. A call is made to the external content system to inform that system of the new instance, along with the configuration settings that have been established for that instance.

Figure 4:
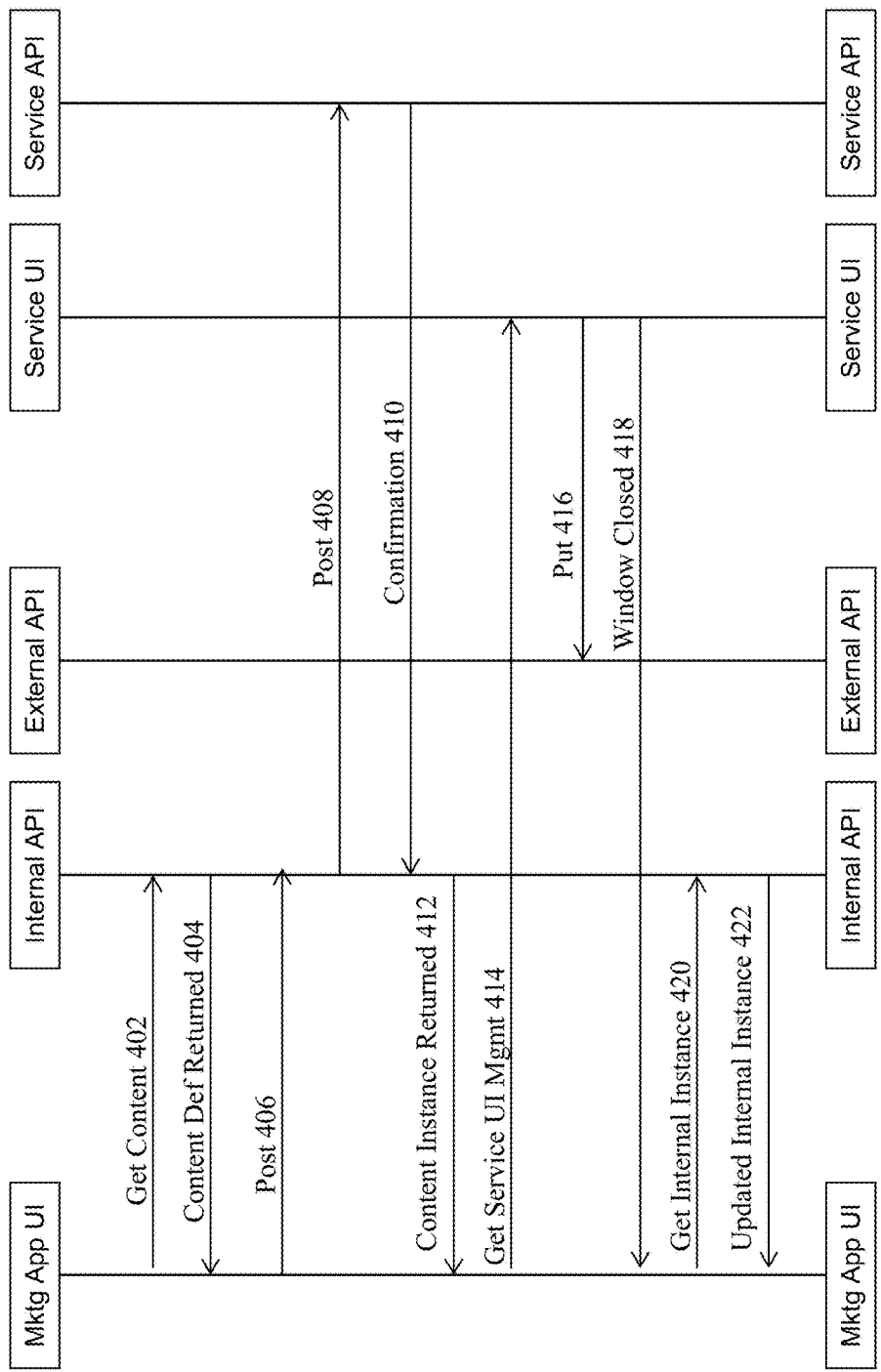
FIG. 4 shows a process flow diagram of the process for instantiating and configuring the new instance of the content service according to some embodiments.

FIG. 4 shows a process flow diagram of the process for instantiating and configuring the new instance of the content service according to some embodiments. Here, the marketing automation application includes an internal applications programming interface (API) that handles calls from its user interface (UI). To the extent an external service needs to be called, then that internal API will use an external API to make those external calls. At the third party service, a service UI and/or service API exist to receive and handle the calls from the marketing automation application.

The process begins when a media browser (or landing page editor) is opened at the user interface for the marketing automation application. This makes a call to identify components that the system already knows about. At this point, a request 402 is sent from the UI for the marketing automation application to be sent to the internal applications API for the application. The request may be in the form of a "GET" call for one or more cloud components. Content definitions 404 may be returned in response to the request 402. This causes the components 210 shown in browser portion 214 to be displayed into the browser window 208 (as shown in FIG. 2).

At this point, any of the cloud content may be selected by the user, e.g., by dragging an item from the media browser onto a design surface or source to trigger creation of an instance of the selected content. When this occurs, a request 406 is made from the UI to the internal API. This request may take the form of a "POST" call, which provides and/or requests an application ID, installation ID, and/or instance ID to the third party instance (e.g., for a given installation ID, requests a new instance ID). This triggers a call 408 (e.g., a POST call) to the third party service through the third party service's API. This notifies the third party that a new instance has been created, and that the new instance needs to be tracked by the third party. Internally, the third party service will maintain a database of such instances that have been created by the marketing automation application.

At this point, a confirmation 410 will be returned from the third party service. If the third party issues its own identifier, then the third party ID will also be returned to the internal API. A full record definition for the new instance may also be returned, e.g., to provide sufficient information to indicate how the new instance is to be displayed. The record definition may include height information, width information, and a default image/icon for the new instance (e.g., as shown for the icon and height/width of the rectangular box for 216 in FIG. 2). The confirmation 412 is then returned from the internal API to the application UI.

Configuration can then occur for the new instance, e.g., using the interface shown in FIG. 3 and selecting the context menu to trigger the configuration UI. In some embodiments, the application UI will block configuration of the service instance until the internal API has responded to the create request with message 412. The user may then operate the configuration UI to configure the new instance. A call 414 (e.g., a GET call) is made to the service UI to perform the configuration. At this point, the control of the configuration interface in the user interface moves to the third party application. In some embodiments, the third party actually forms the configuration window 302 that is displayed in the user interface. For any user selections to perform the configuration, the third party will internally make those configuration changes, e.g., by modifying the internal database at the third party service that tracks the instances to make the necessary changes. Such changes may include, for example, internal service settings that pertain to selection of specific marketing offers to be presented to the end-recipients of the emails/landing pages. The third party service may response with a call 416 (e.g., a PUT call), and then the system may proceed to 418 to close the window when no further responses are warranted to the UI.

The control then passes back to the UI for the marketing automation application. The UI may then make a call 420 (e.g., a GET call) to the internal API to obtain the internal instance by its ID. The marketing automation application then internally updates its own records to account for the configurations that have been made to the instance, e.g., to account for any height/width changes that were made to the content instance. An updated internal instance is returned at 422 to the UI.

Figure 5:
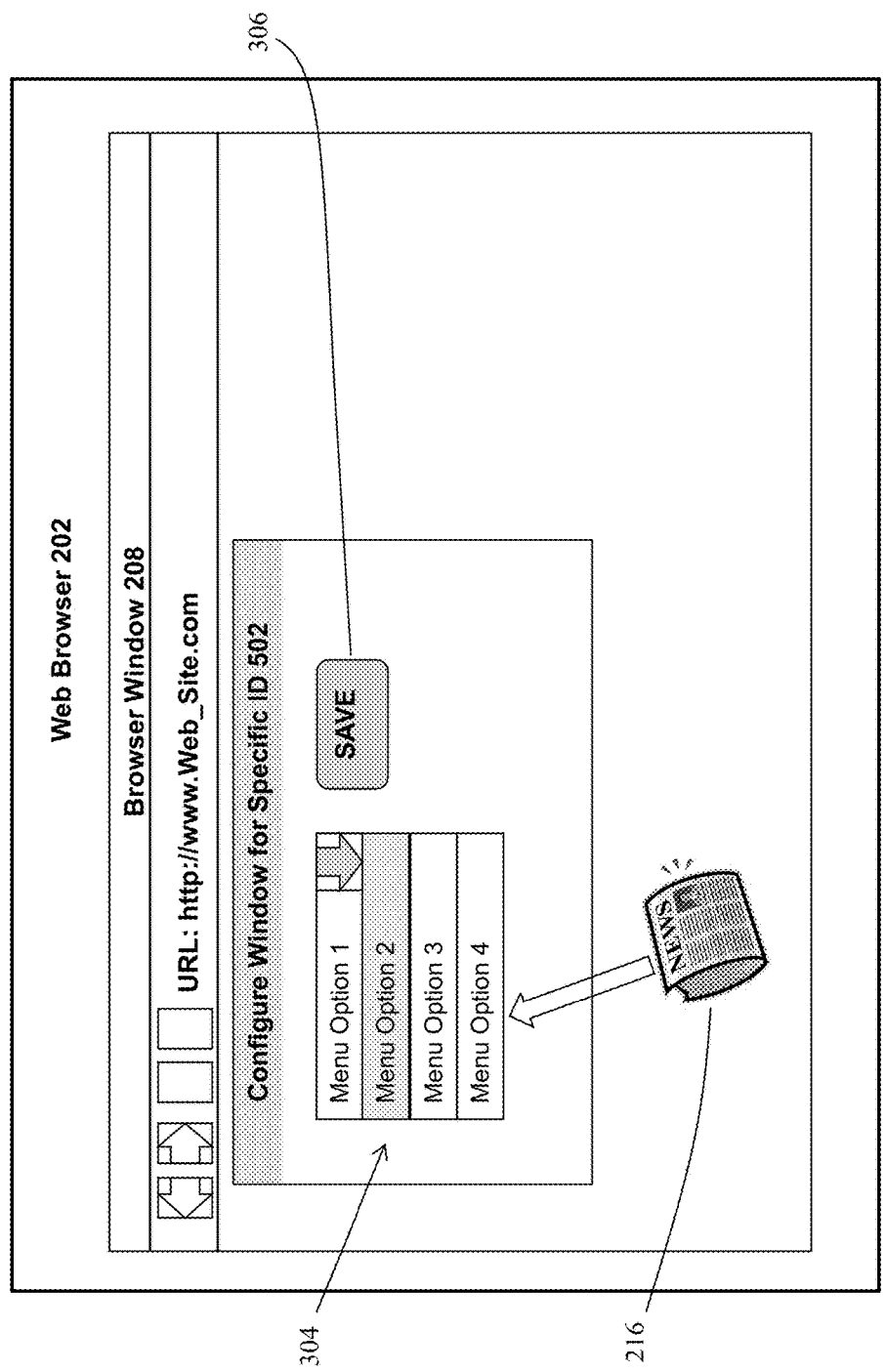
FIG. 5 shows an interface to configure the content instance.

In some embodiments, the marketing user has the ability to update external content in an Email or Landing Page through the editors. To accomplish this, the user interface displays a content box (e.g., with the imageUrl from the content instance) to the user. To configure the content instance, the user interacts with the interface, e.g., by double clicking or right-clicking the content box 216 to configure it, as shown in FIG. 5. A configuration window 502 for that instance can then be displayed in the browser 202. If the content service definition is fixed layout, the UI can be configured to display an icon over the box to indicate to the user that the sizing cannot be changed. If the definition is a flow layout, a different treatment should be given to indicate that the height and/or width can be changed.

Figure 6:
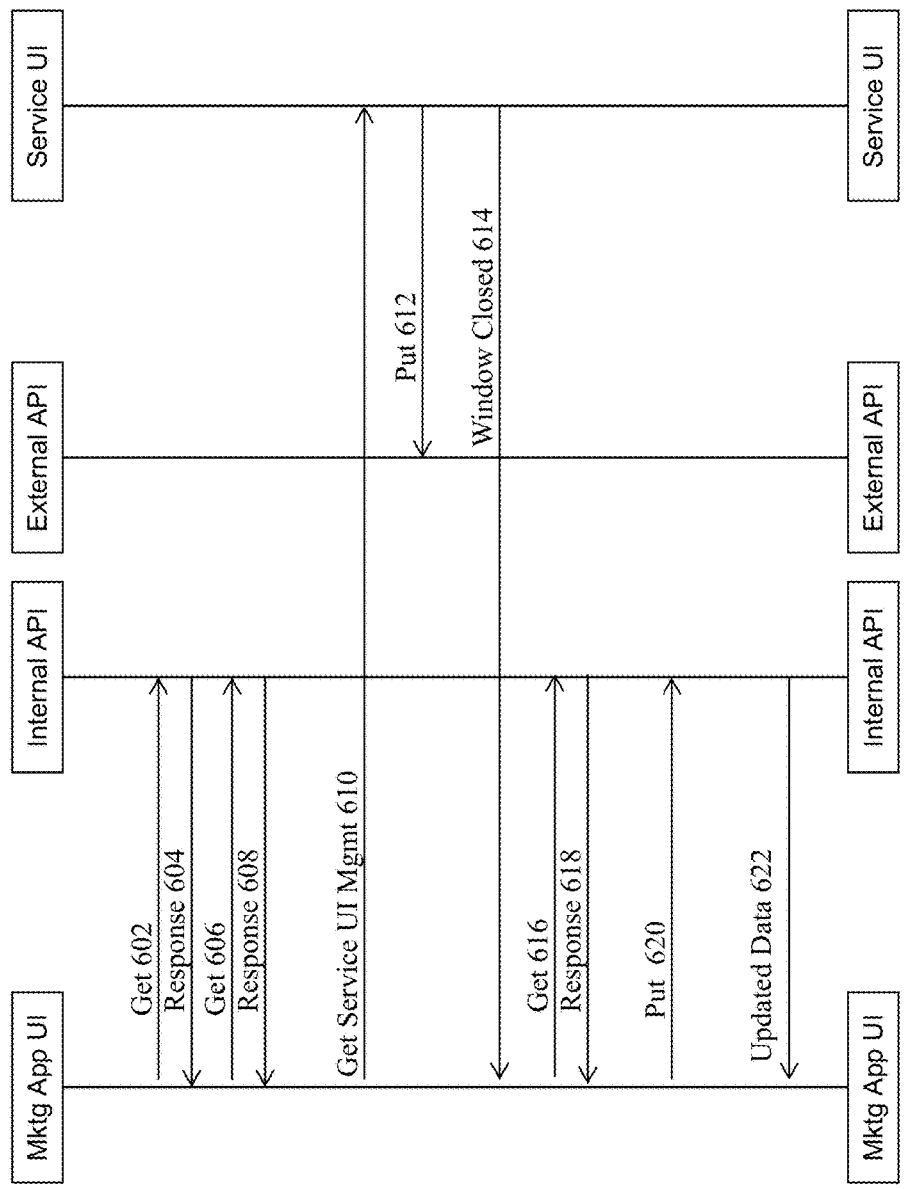
FIG. 6 shows a process flow diagram of the process for updating external content in an email or landing page.

FIG. 6 shows a process flow diagram of the process for updating external content in an email or landing page, e.g., to make content or presentation changes (such as height or width changes to the displayed instance(s)). The process loads the email or landing page into the browser to trigger the GET of the referenced content instances. This causes the call 602 to be sent from the UI of the marketing automation application to its internal API. The call 602 may be implemented as a GET call for email or the landing page (using either the email ID or landing page ID). A response 604 is provided that the email or landing page at its complete depth. A call 606 is made, e.g., a GET call identifying the instance ID for each relevant instance. A response 608 is provided that includes the content instance contract(s).

Configuration can then occur for the new instance, e.g., using the interface shown in FIG. 5 and selecting the context menu to trigger the configuration UI. The UI can be configured to display UI treatment instance information and allow for configuration changes of the instances on the email/landing page. The user may then operate the configuration UI to configure the new instance. A call 610 (e.g., a GET call) is made to the service UI to perform the configuration. At this point, like the similar portion of the flow in FIG. 4, the control of the configuration interface in the user interface moves to the third party application. In some embodiments, the third party forms the configuration window 302 that is displayed in the user interface. For any user selections to perform the configuration, the third party will internally make those configuration changes, e.g., by modifying the internal database at the third party service that tracks the instances to make the necessary changes. Such changes may include, for example, internal service settings that pertain to selection of specific marketing offers to be presented to the end-recipients of the emails/landing pages. The third party service may response with a call 612 (e.g., a PUT call), and then the system may proceed to 614 to close the window when no further configuration changes need to be made.

The control then passes back to the UI for the marketing automation application. The UI may then make a call 616 (e.g., a GET call) to the internal API to obtain the internal instance by its ID. The marketing automation application then internally updates its own records to account for the configurations that have been made to the instance, e.g., to account for any height/width changes that were made to the content instance. An updated internal instance is returned at 618 to the UI.

The user may then save the email or landing page. A call 620 is made from the UI to the internal API to perform the save operation. The call 620 may be implemented as a PUT call using the email ID and/or landing page ID. If the call is referring to an instance that does not exist, then this results in an error. In some embodiments, referencing an instance that exists in another email/landing page will cause a copy of the instance to be created (as described in more detail below). The updated email or landing page is returned at 622.

As previously noted, some embodiments of the invention provide functionality to allow a user to create an email/landing page having a content instance that is already referenced by another email or landing page. When content is created that refers to an existing instance, the process will actually create a new instance for the newly created page/landing page (and will prevent referencing of the old instance in the email/landing page). Therefore, when the email/landing page is being persisted, validation can be performed to verify whether any content instances are already referenced by another container. In the case that they are, these references can be copied in the external service and the new service instance ID can be referenced instead.

Figure 7:
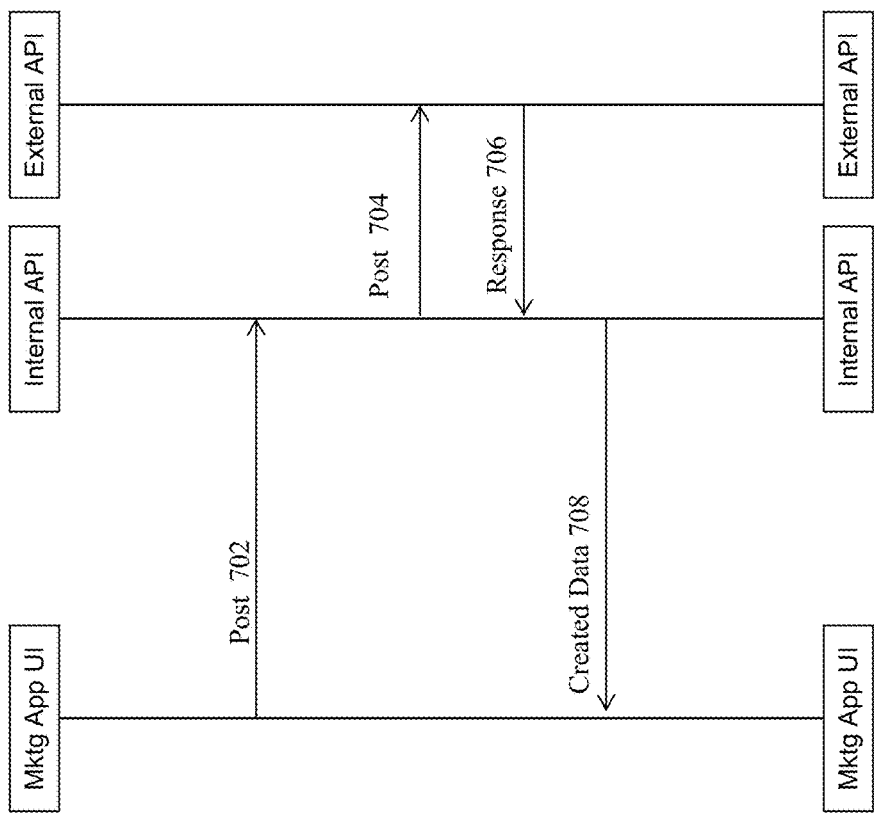
FIG. 7 shows a process diagram of the process for creating an email and/or landing page having a content instance.

FIG. 7 shows a process diagram of the process for creating an email and/or landing page having content which references one or more content instances that are already referenced by another email or landing page. A call 702 is made from the UI to the internal API. The call 702 may be implemented as a POST call that refers to the email ID or landing page ID.

A parse is then performed of the content to find references to content instances that are already being referenced by another email or landing page. For each reference that is identified, this triggers a call 704 (e.g., a POST call) for a copy operation to the service API. The third party service then proceeds to create a new instance, and the new instance ID and record definition for the new instance is then returned in the response 706. In some embodiments, the returned record definition is copied from the record definition for the instance that is being copied.

For each reference that is copied, the old ID is replaced with the new instance ID. The email/landing page can then be saved. The created email/landing page is then displayed in the UI at 708. It is noted that in some embodiments, the copy endpoints will also need to participate in this approach.

Some embodiments of the invention provide functionality to allow a user to copy an email/landing page having a content instance. In effect, the user interface is used to copy an existing email or landing page to create a new email/landing page, and the new email/landing page will include all of the content inside the copied email/landing page (including instances of cloud content within the copied email/landing page). However, when the existing instance is being copied, the process will create a new instance (and will prevent referencing of the old instance in the copied email/landing page). Therefore, when the email/landing page is being persisted (whether create or copy), validation should be performed to see whether any content instances are already referenced by another container. In the case that they are, these references can be copied in the external service and the new service instance ID can be referenced instead.

Figure 8:
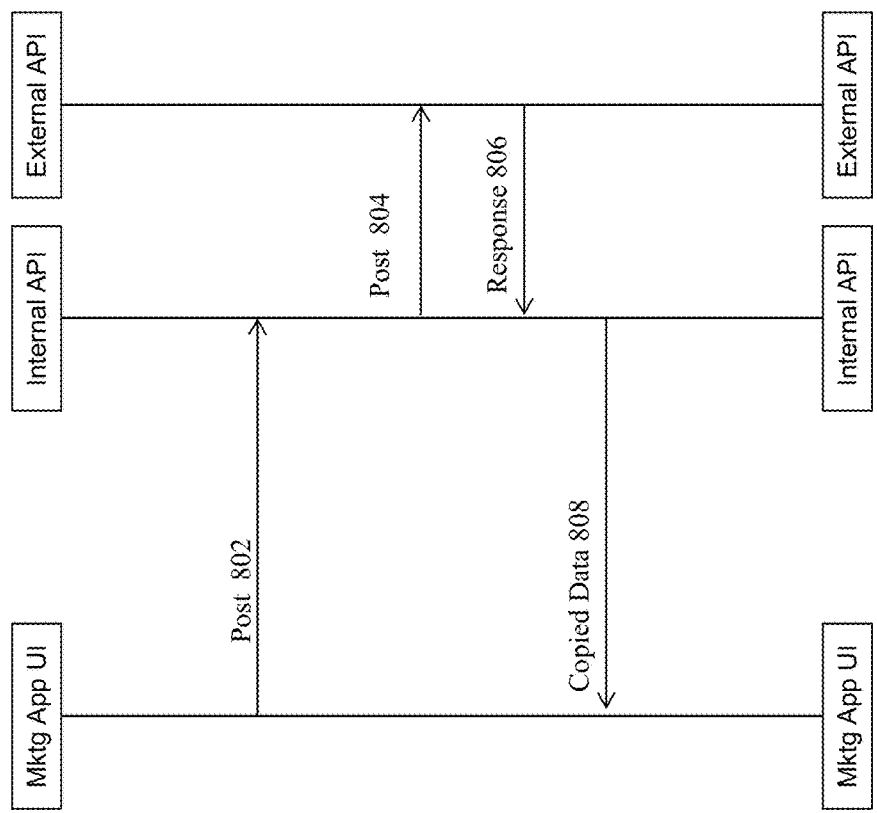
FIG. 8 shows a process diagram of the process for copying an email and/or landing page having a content instance.

FIG. 8 shows a process diagram of the process for copying an email and/or landing page which includes one or more content instances that are already referenced by another email or landing page. A call 802 is made from the UI to the internal API. The call 802 may be implemented as a POST call that refers to the email ID or landing page ID.

A parse is then performed of the content to find references to content instances that are already being referenced by another email or landing page. For each reference that is identified, this triggers a call 804 (e.g., a POST call) for a copy operation to the service API. The third party service then proceeds to create a new instance, and the new instance ID and record definition for the new instance is then returned in the response 806. In some embodiments, the returned record definition is copied from the record definition for the instance that is being copied.

For each reference that is copied, the old ID is replaced with the new instance ID. The email/landing page can then be saved. The created email/landing page is then displayed in the UI at 808. As before, the copy endpoints may also need to participate in this approach.

It is noted that these techniques may also be used by a user to create/copy a new email or landing page from a template that has a content instance on it. The template approach would be implemented with the above-described processes to replace the old instance IDs with newly assigned instance IDs.

This portion of the document will now describe illustrative embodiments of the engines and processes that execute and that triggers calls out to the external service to render the landing page or email.

Figure 9:
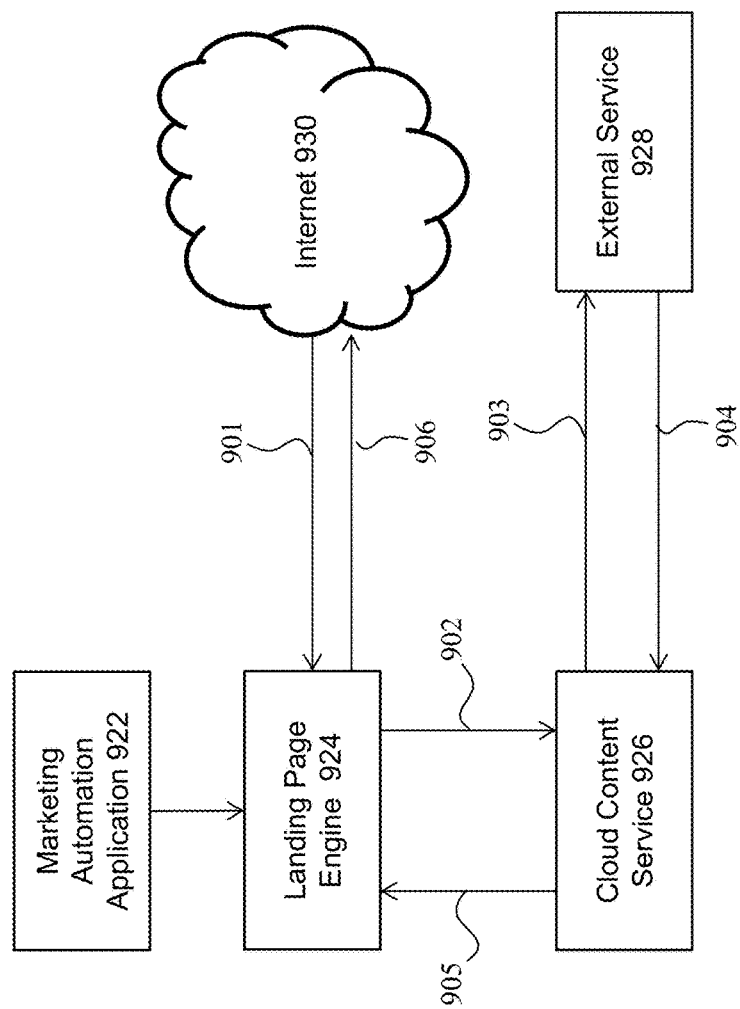
FIG. 9 shows a diagram that illustrates rendering of a landing page having a content instance.

FIG. 9 shows a diagram that illustrates rendering of a landing page created by a marketing automation application 922 having one or more third party cloud content instances. When a visitor visits a landing page, there is a request that is made to the landing page engine to render the landing page. Therefore, at 901, a landing page is visited by a visitor from the internet 930, causing a render request for the page to be placed to the landing page engine 924.

The system may notice that the landing page includes external cloud content (e.g., the landing page references a cloud instance). When a landing page is to be rendered with one or more external content instances on it, the landing page rendering engine 924 calls out to the external service to get the content. A cloud content service 926 is called with a request at 902 to obtain the cloud content. At 903, the cloud content service 926 calls out to the external service 928 to obtain the requested content. This call is based, for example, at least partly on the configurations setting that have been configured for the cloud content.

At 904, the external service 928 will respond to the cloud content service 926 with the requested content. At 905, the cloud content service 926 notifies the landing page engine 924 that the cloud content is available and will provide that content to the landing page engine 924. At this point, the landing page engine will continue with the rendering of the landing page. The rendering of the landing page will include content merging of the cloud content from the external service with content natively provided by the user/marketing automation application 922. When the landing page engine has finished rendering the landing page, the appropriate HTTP response is made at 906 to the visitor across the Internet 930.

Figure 10:
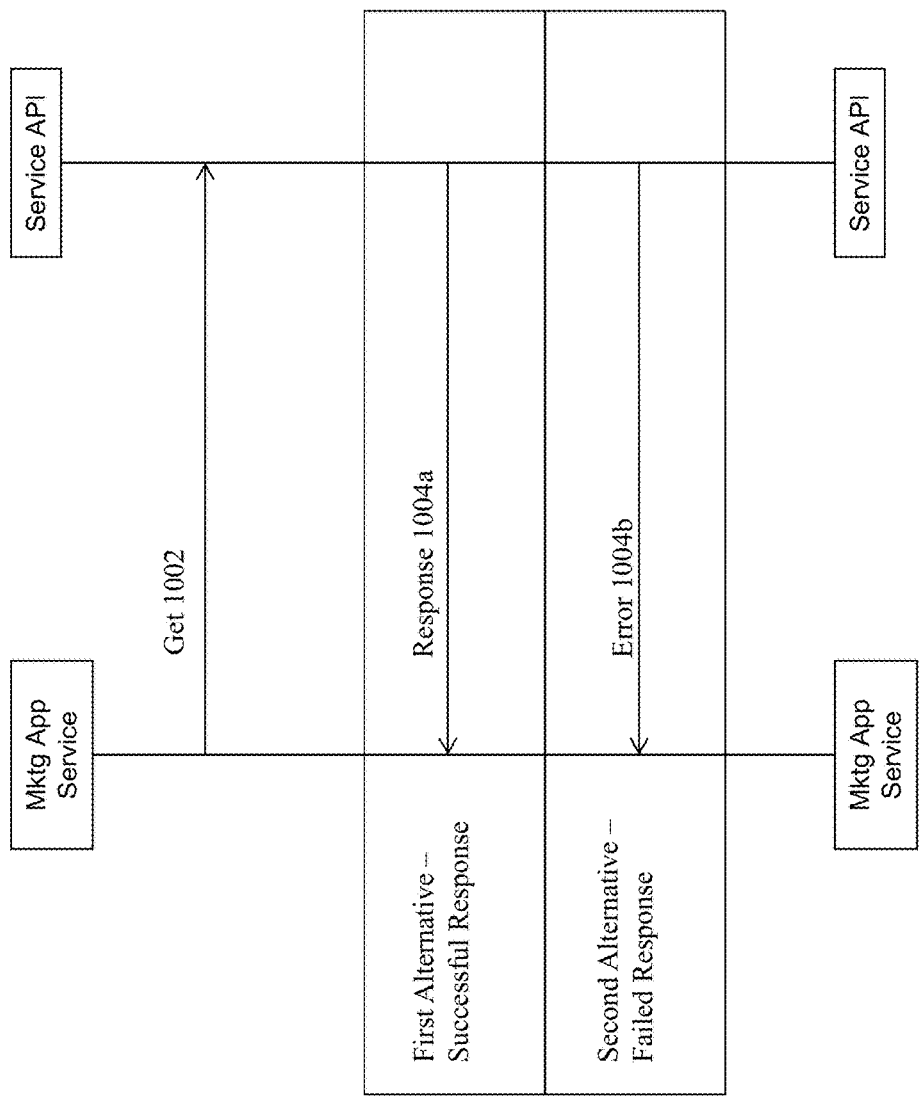
FIG. 10 is a process flow diagram for the process of FIG. 9.

FIG. 10 is a process flow diagram for this process to render the landing page. The process is triggered by a visit to the landing page. A call 1002 is made from the cloud content service to the external service's API. In some embodiment, if the service API is invalid for some reason (e.g., it is uninstalled, deleted or it does not support landing pages), then default content in the service registration will be used and no call out to the service API will be made. Otherwise, the htmlUrl property of the instance definition is used to access the external content. For this, a GET request is used with the substituted htmlUrl property.

In some embodiments, the expected successful response 1004a from the htmlUrl is text/html to be merged into the landing page. In some cases, and error may occur having a failed response with an error 1004b being returned. For example, if the service API cannot be reached (e.g., it is simply not reachable or the HTTP request has an error), then the default content in the service registration can be used. In some embodiments, outgoing requests are logged, along with the response status code.

Figure 11:
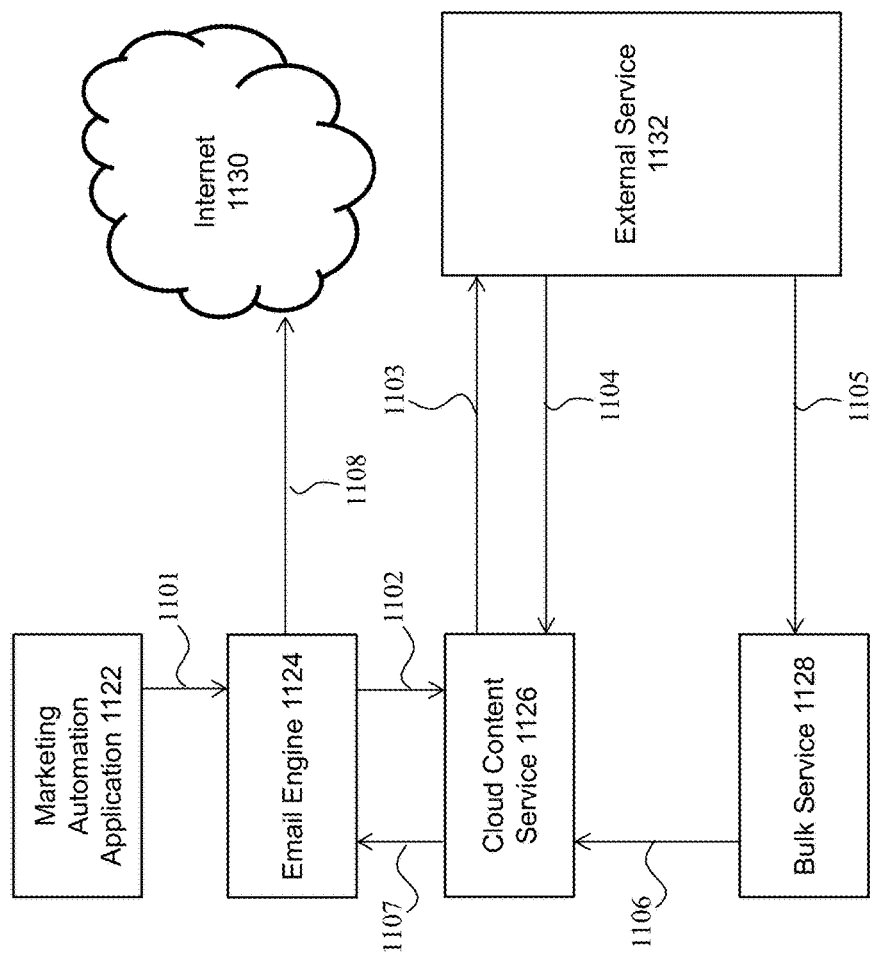
FIG. 11 shows a diagram that illustrates sending of emails having cloud content.

FIG. 11 shows a diagram that illustrates a system for sending emails having external cloud content. In some cases, an email deployment is created/initiated from the marketing automation application 1122, which results in a request 1101 being sent from the marketing automation application 1122 to an email engine 1124. This effectively "enqueues" the email deployment. The enqueue functionality determines the external content requirement(s). If external content is not required, then the deployment is queued for dispatch by the email engine 1124.

On the other hand, the email deployment may have been configured to include third party cloud content, e.g., using the processes described above. If this is the case, then then the deployment is queued for the content fetch service 1126. A request 1102 is sent from the email engine 1124 to the cloud content service 1126 to obtain the cloud content. At this point, the email deployment is paused.

The cloud content service 1126 determines the external content requirements on a per-recipient basis. The cloud content service 1126 will then contact the external service 1132 for the content by sending request 1103. The request is based at least in part on configuration settings for the instance(s) of the cloud content within the email. The external service 1132 will then provide a response 1104 back to the cloud content service 1126.

In some embodiments, there are multiple modes of operations that may be implemented for email deployments. One possible approach is to respond on an inline basis so that each email is deployed with content provided inline by the external service. This approach is performed, for example, if the exact same cloud content is being provided for multiple/all emails to be deployed. Another possible approach is to provide the content asynchronously, e.g. by using a batch/bulk service. This approach may be used, for example, if the cloud content is different for each/many of the different emails, and thus the external service needs additional time to prepare the content (more time than is practical for an inline response). This also avoids loading all recipients into memory of the cloud content service at the same immediate time. Therefore, response 1104 from the external service 1132 is dependent upon the mode of operation begin sought for the email deployment. The response may include asynchronous response, static content, or a failure/error message for a failed response.

For an inline response, inline content is directly returned back to the cloud content service 1126 from the external service 1132.

In the case of bulk/batch email deployment, the external service 1132 provides an asynchronous response 1105 having personalized content for the emails in the deployment. The asynchronous response 1105 is provided to a bulk service 1128 that asynchronously handles the content from the external service 1132. The bulk service 1128 performs synchronization on the cloud content for the emails in the deployment, and when finished, send a message 1106 to the cloud content service 1126 indicating that the cloud content is available.

The external service 1132 returns content for the one or more recipients. The cloud content service may store content with requirements and may queue for dispatch any recipients who have no outstanding requirements. However, recipients awaiting more content may remain in a wait state until content arrives to satisfy requirements When the necessary cloud content is available, the email deployment can continue. A message 1107 is sent from the cloud content service 1126 to notify the email engine 1124 of the availability of the cloud content. The email engine then performs the email deployment, e.g., by generating personalized emails for intended recipients that include the cloud content merged with content from the marketing automation application 1122. The personalized emails 1108 are then deployed, e.g., across the Internet 1130.

Figure 12:
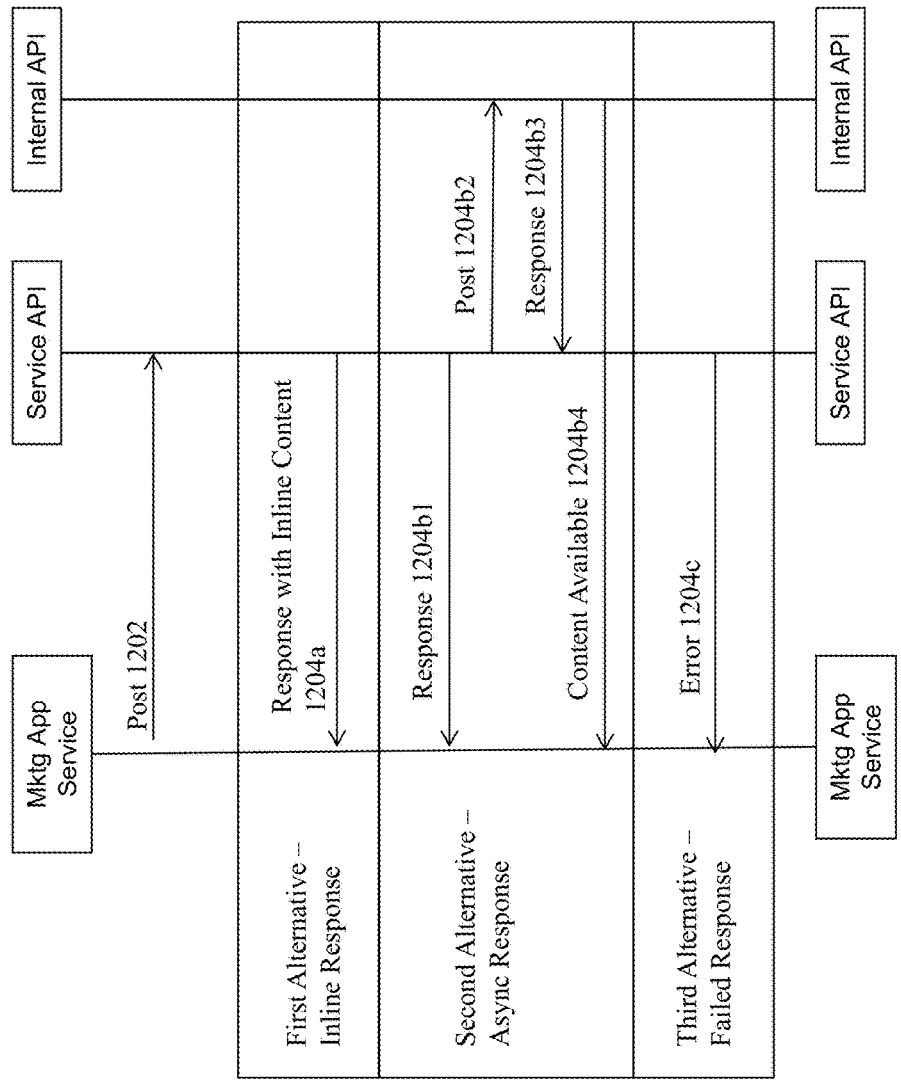
FIG. 12 is a process flow diagram for the process of FIG. 11.

FIG. 12 is a process flow diagram for this process. When an email is rendered with one or more external content instances on it, this triggers the email rendering engine to call out to the external service to get the content. A call 1202 is made from the marketing application service to the service API. If the service API is invalid for some reason (e.g., it is uninstalled, deleted or it does not support emails), then the email send will fail and no call out to the service API will be made. The instance definition can be used to access the external content. For example, a POST request can be made with the body of the POST request formatted according to the configuration settings.

Assuming application/json, an example of a definition that is pertinent to a contact ID and email could be implemented as:

```
{
   "ContactId": "{{Contact.Id}}",
   "Email": "{{Contact.Field(C_EmailAddress)}}"
}
```

Note that this would describe the POST body for a single record. So, for a batch containing 2 records, the body could contain data such as:

```
[
   { "ContactId": "1234", "Email": "test1@example.com" },
   { "ContactId": "5678", "Email": "test2@example.com" }
]
```

Assuming text/csv instead, the POST body could be implemented as follows:

```
ContactId,Email
12345,test1@example.com
5678,test2@example.com
```

For the service API, there are different valid ways to respond to the POST call. In a first mode of operation, an inline response 1204a is returned from the service API. The purpose here in some embodiments is to return the same (externally hosted) content for all contacts. With this response, the expected content-type is for example text/html, where the inline html will be merged into the email.

In another mode of operation, a response 1204b1 is returned to indicate that content is not directly being returned to the cloud content service. Instead, the cloud content will be processed asynchronously to the bulk service, and a callback URL parameter will be provided. With this response, the service API is responsible for calling back into the internal API at the marketing automation application (using the callback URL) to continue the sending process. Therefore, a POST call 1204b2 is made to the internal API from the service API, and a (successful) response 1204b3 is returned back from the service API to the service UI after successfully processing the asynchronous response. Note that not all members may be needed in the callback at once (e.g., the callback process can be broken into several sets of records if necessary).

The expected body for the /content/{id}/data POST in some embodiments is a csv/json array, with the contact ID, and the instance ID mapping the contact to the new html content. For example, for the two records above and an instance id of 059eade9-aad0-4dc2-b24f-3aa7c1f2ff4d, the following can be used:

```
[
   { "ContactId": "1234", "059eade9-aad0-4dc2-b24f-3aa7c1f2ff4d":
"<p>This is content for test1</p>" },
   { "ContactId": "5678", "059eade9-aad0-4dc2-b24f-3aa7c1f2ff4d":
"<p>This is content for test2</p>" }
]
```

If the service API cannot be reached (it is simply not reachable or the HTTP request has an error), then the email sending will fail with an error 1204c. In some embodiments, outgoing requests are logged, along with the response status code.

Therefore, what has been described is an approach for implementing an improved system, method, and computer program product for marketing automation product, where an external content service is integrated with the marketing automation tool.

System Architecture Overview

Figure 13:
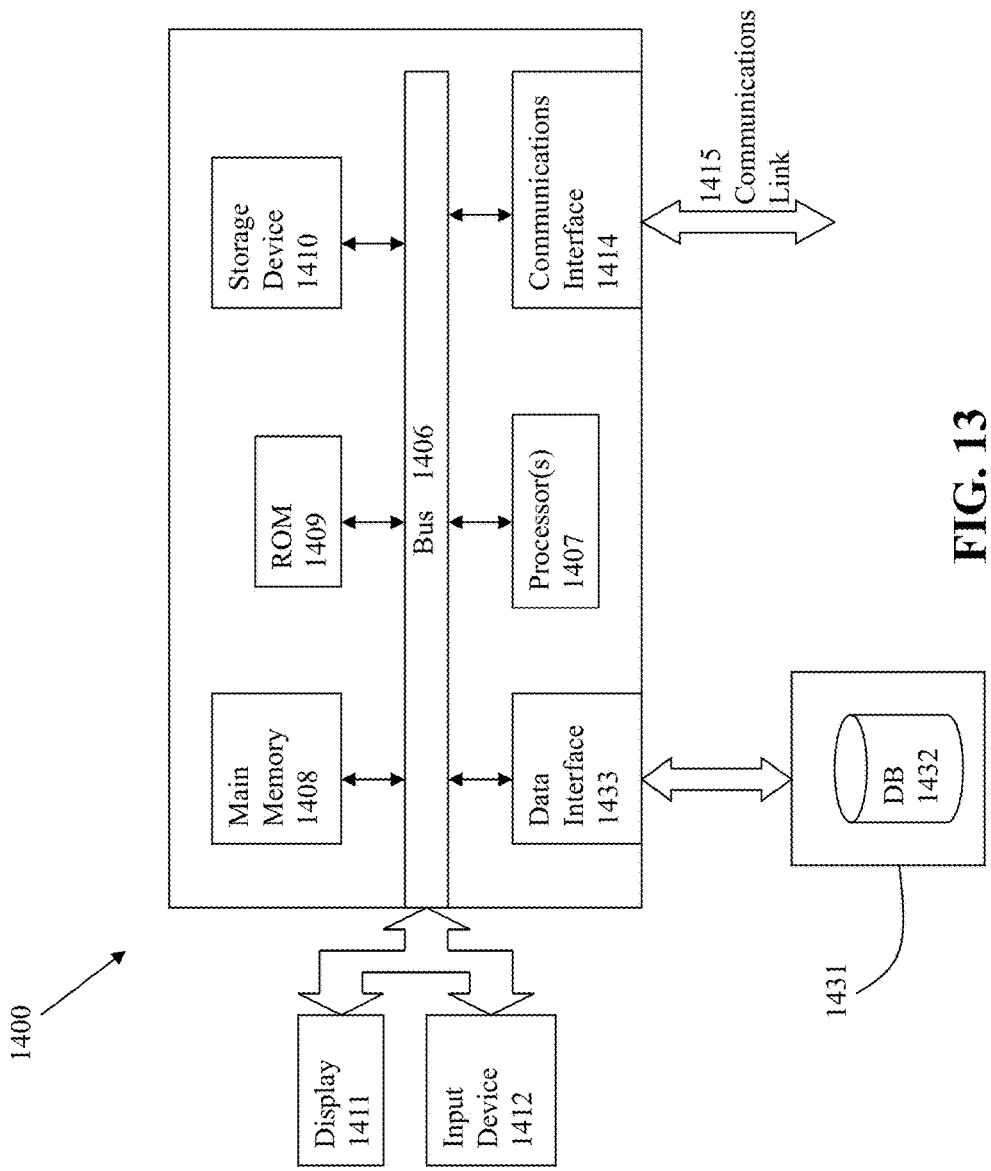
FIG. 13 shows an architecture of an example computing system with which the invention may be implemented.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computing system for dissemination of targeted information, the system comprising:
   a marketing computer system comprising a processor and a memory, the marketing computer system programmed to execute:
      an automation application stored in the memory of the marketing computer system, and programmed to:
         receive, via a user interface, a user selection of an content component item for incorporation into a distribution content template, wherein the user selection comprises a placement of the content component item within the distribution content template;
         generate an instance of the content component item in response to the user selection, wherein the instance of the content component item corresponds to external content to be incorporated within the distribution content template according to the placement and the content component item is stored by an external computer system;
         initiate a configuration interface comprising interface elements used to define configuration settings for the instance of the content component item, wherein the configuration settings, when specified, control at least a layout of the instance of the content component item within the distribution content template;
         transfer control of the configuration interface to the external computer system; and
         receive, from the external computer system, configuration information for the instance of the content component item, the configuration information including a modification to the configuration settings for the instance of the content component item and wherein the instance of the content component item will be subsequently obtained front the external computer system, wherein the configuration settings, as modified, control at least the layout of the instance of the content component item within the distribution content template; and
      a render engine stored in the memory of the marketing computer system, and programmed to:
         transmit, to the external computer system and in response to a request to render the distribution content, a request for the instance of the content component item;
         receive the requested instance of the content component item from the external computer system;
         merge the received instance of the content component item with the internal content stored in the memory of the marketing computer system into the distribution content template to generate the distribution content; and
         render the distribution content that includes the instance of the content component item according to the configuration information;
   the external computer system comprising a second processor and a second memory, the external computer system programmed to:
      receive control of the configuration interface;
      define, via the configuration interface, the configuration information for the instance of the content component item wherein the configuration information includes a modification of the configuration settings for the instance of the content component item;
      store the configuration information in the second memory;
      transmit the configuration information to the automation application; and
      separately from transmitting the configuration information to the automation application, transmit, in response to a request from the marketing computer system and based on the configuration information, the instance of the content component item to the render engine.

2. The system of claim 1, wherein the distribution content comprises a personalized email, the render engine comprises an email deployment engine, and the personalized email comprises the instance of the content component item merged with content generated by the automation application.

3. The system of claim 1, wherein the distribution content comprises a personalized landing page, the render engine comprises a landing page engine, and the personalized landing page comprises the instance of the content component item merged with web page content generated by the automation application.

4. The system of claim 1, further comprising a bulk service, wherein the bulk service receives asynchronously generated content from the external commuter system.

5. The system of claim 1, wherein the configuration interface is generated by the eternal computer system.

6. The system of claim 1, wherein the marketing computer system further comprises:
   an internal API to receive calls from the user interface; and
   an external API to receive calls from the internal API and to interact with a service API at the external computer system.

7. The system of claim 1, wherein the instance of the content component item comprises an instance of an image stored by the external computer system and the configuration information includes at least one of height and width dimensions of the instance of the image.

8. The system of claim 1, wherein the configuration settings include a cache timeout setting that sets the amount of time that the marketing computer system caches the instance.

9. A method for dissemination of targeted information, comprising:
   receiving, by a marketing computer system and via a user interface, a user selection identifying a content component item to be deployed by the marketing computer system within distribution content, wherein the user selection comprises a placement of the content component item within a distribution content template and wherein the marketing computer system is operated by a first entity;

generating, by the marketing computer system, an instance of the content component item in response to the user selection, wherein the instance of the content component item corresponds to external content to be incorporated within the distribution content template according to the placement and the content component item is stored by an eternal computer system;

initiating, by the marketing computer system, a configuration interface comprising interface elements used to define configuration settings for the instance of the content component item wherein the configuration settings when specified, control at least a layout of the instance of the content component item within the distribution content template;

transferring, by the marketing computer system, control of the configuration interface to an external computer system, wherein the external computer system is operated by a second entity and the first entity is different from the second entity;

defining, by the external computer system and via the configuration interface, configuration information for the instance of the external content component, the configuration information including a modification to the configuration settings for the instance of the content component item and wherein the configuration settings, as modified, control at least the layout of the instance of the content component item within the distribution content template;

storing, by the external computer system, the configuration information, transmitting, by the eternal computer system, the configuration information to the marketing computer system, wherein the instance of the content component item will be subsequently transmitted by the external computer system to the marketing computer system;

calling, by the marketing computer system and in response to a request to render the distribution content, the external computer system to obtain the instance of the content component item;

separately from transmitting the configuration information to the marketing computer system, transmitting, by the external computer system, the requested instance of the content component item to the marketing computer system;

generating, by the marketing computer system, the distribution content by merging the received content component item from the second entity with internal content from the first entity into the distribution content template; and rendering, by the marketing computer system, the distribution content that includes the instance of the content component item according to the configuration information.

10. The method of claim 9, wherein the distribution content comprises a personalized landing page, and the personalized landing page is generated by merging the instance of the content component item with web page content generated by the marketing computer system.

11. The method of claim 9, wherein the distribution content comprises a personalized email, and the personalized email is generated by merging the instance of the content component item with content generated by the marketing computer system.

12. The method of claim 11, in which the instance of the content component item is received asynchronously from the external computer system to generate the personalized email.

13. The method of claim 11, where the marketing computer system is operated as a Software as a Service (SaaS) system, and the entity that operates the external computer system is a SaaS customer of the marketing computing system.

14. The method of claim 11, wherein calls to the external computer system correspond to a first set of calls between a user interface and an internal API at the marketing computer system, a second setoff calls between the internal API and an external API at the marketing computer system, and a third set of calls between the external API and the external computer system.

15. The method of claim 9, wherein the instance of the content component item comprises an instance of an image stored by the external computer system and the configuration information includes at least one of height and width dimensions of the instance of the image.

16. A system for dissemination of targeted information, comprising:

a marketing system comprising a first non-transitory, computer-readable medium having stored thereon a sequence of instructions which, when executed by at least one first processor causes the at least one first processor to execute a process, the process comprising:

receiving, via a user interface, a user selection identifying a content component item to be deployed, wherein the user selection comprises a placement of the content component item within a distribution content template and wherein the marketing system is operated by a first entity;

generating an instance of the content component item in response to the user selection, wherein the instance of the content component item comprises content to be incorporated within the distribution content template according to the placement and the content component item is stored by an external system;

initiating a configuration interface comprising interface elements used to define configuration settings for the instance of the instance of the content component item wherein the configuration settings, when specified, control at least a layout of the instance of the content component item within the distribution content template;

transferring control of the configuration interface to the external system, wherein the external system is operated by a second entity and the first entity is different from the second entity;

receiving, from the external system, configuration information for the instance of the content component item, the configuration information including a modification to the configuration settings for the instance of the content component item, wherein the instance of the content component item will be subsequently obtained from the external computer system and wherein the configuration settings, as modified, control at least the layout of the instance of the content component item within the distribution content template;

calling, in response to a request to render the distribution content, the external system to obtain the instance of the content component item;

receiving the instance of the content component item from the external system;

generating the distribution content by merging the received instance of the content component item from the second entity with internal content from the first entity; and rendering the distribution content that includes the instance of the content component item according to the configuration information; and the external system comprising a second non-transitory computer-readable medium having stored thereon a sequence of instructions which, when executed by at least one second processor causes the at least one second processor to execute a process, the process comprising:

receiving control of the configuration interface from the marketing system;

defining, via the configuration interface, the configuration information for the instance of the content component item, wherein the configuration information includes the modification of the configuration settings for the instance of the content component item;

storing the configuration information;

transmitting the configuration information to the marketing system;

receiving a call from the marketing system requesting the instance of the content component item according to the configuration information; and separately from transmitting the configuration information to the marketing system, transmitting the requested instance of the content component item to the marketing system.

17. The system of claim 16, wherein the distribution content comprises a personalized landing page, and the personalized landing page is generated by merging the instance of content component item with content generated by the marketing system.

18. The system of claim 16, wherein the distribution content comprises a personalized email, and the personalized email is generated by merging the instance of the content component item with content generated by the marketing system.

19. The system of claim 18, in which the instance of the content component item is received by the marketing system, asynchronously from the external system to generate the personalized email.

20. The system of claim 16, where the marketing system is operated as a Software as a Service (SaaS) system, and the second entity that operates the external system is a SaaS customer of the marketing system.

21. The system of claim 16, wherein calls to the external system correspond to a first set of calls between a user interface and an internal API at the marketing system, a second setoff calls between the internal API and an external API at the marketing system, and a third set of calls between the external API and the external system.

22. The system of claim 16, wherein the instance of the content component item comprises an instance of an image stored by the second non-transitory computer-readable medium and the configuration information includes at least one of height and width dimensions of the instance of the image.

* * * * *

UNITED STATES PATENT AND TRADEMARK OFFICE
CERTIFICATE OF CORRECTION

PATENT NO. : 9,978,085 B2
APPLICATION NO. : 14/490337
DATED : May 22, 2018
INVENTOR(S) : Robinson et al.

Page 1 of 1

It is certified that error appears in the above-identified patent and that said Letters Patent is hereby corrected as shown below:

In Column 12, Line 53, after "requirements" insert -- . --.

In Column 15, Line 57, in Claim 1, delete "front" and insert -- from --, therefor.

In Column 16, Line 44, in Claim 4, delete "commuter" and insert -- computer --, therefor.

In Column 16, Line 46, in Claim 5, delete "eternal" and insert -- external --, therefor.

In Column 17, Line 13, in Claim 9, delete "eternal" and insert -- external --, therefor.

In Column 17, Line 37, in Claim 9, delete "information," and insert -- information; --, therefor.

In Column 17, Line 38, in Claim 9, delete "eternal" and insert -- external --, therefor.

In Column 18, Line 17, in Claim 14, delete "setoff" and insert -- set of --, therefor.

In Column 18, Line 48, in Claim 16, delete "instance of the instance of the" and insert -- instance of the --, therefor.

In Column 20, Line 8, in Claim 17, after "of" insert -- the --.

In Column 20, Line 15, in Claim 19, delete "received" and insert -- received, --, therefor.

In Column 20, Line 25, in Claim 21, delete "setoff" and insert -- set of --, therefor.

Signed and Sealed this
Sixth Day of November, 2018

Andrei Iancu
*Director of the United States Patent and Trademark Office*